United States Patent
Chen et al.

(10) Patent No.: US 11,736,327 B2
(45) Date of Patent: Aug. 22, 2023

(54) UPLINK TRANSMISSION METHOD AND TERMINAL

(71) Applicant: VIVO MOBILE COMMUNICATION CO., LTD., Guangdong (CN)

(72) Inventors: Xiaohang Chen, Guangdong (CN); Peng Sun, Guangdong (CN); Xueming Pan, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 17/036,496

(22) Filed: Sep. 29, 2020

(65) Prior Publication Data

US 2021/0067390 A1 Mar. 4, 2021

Related U.S. Application Data

(63) Continuation of application No. PCT/CN2019/077795, filed on Mar. 12, 2019.

(30) Foreign Application Priority Data

Mar. 30, 2018 (CN) .......................... 201810276657.9

(51) Int. Cl.
  *H04L 27/26* (2006.01)
  *H04L 5/00* (2006.01)
  *H04W 76/27* (2018.01)
  *H04W 80/02* (2009.01)
  *H04W 28/26* (2009.01)

(52) U.S. Cl.
  CPC ........ *H04L 27/2613* (2013.01); *H04L 5/0051* (2013.01); *H04L 27/2607* (2013.01);
  (Continued)

(58) Field of Classification Search
  None
  See application file for complete search history.

(56) References Cited

U.S. PATENT DOCUMENTS

2010/0098010 A1 4/2010 Kuo
2018/0007730 A1 1/2018 Fujishiro
(Continued)

FOREIGN PATENT DOCUMENTS

JP 2010103991 A 5/2010
JP 2017168874 A 9/2017
(Continued)

OTHER PUBLICATIONS

Discussion on procedures related to NOMA, Feb. 26-Mar. 2, 2018, 5 pages.
(Continued)

*Primary Examiner* — Peter Chen
*Assistant Examiner* — Jeff Banthrongsack
(74) *Attorney, Agent, or Firm* — Brooks Kushman P.C.

(57) ABSTRACT

An uplink transmission method and a terminal are provided. The uplink transmission method is applied to a terminal and includes: acquiring at least one piece of demodulation reference signal (DMRS) configuration information and at least one multiple access signature configured by a network device; selecting a piece of target DMRS configuration information and a target multiple access signature, which have a corresponding relationship, from the at least one piece of DMRS configuration information and the at least one multiple access signature, and performing an uplink transmission; where one piece of DMRS configuration information corresponds to one multiple access signature, and different multiple access signatures correspond to different pieces of DMRS configuration information.

9 Claims, 4 Drawing Sheets

(52) U.S. Cl.
CPC ........... *H04W 28/26* (2013.01); *H04W 76/27* (2018.02); *H04W 80/02* (2013.01)

(56) References Cited

U.S. PATENT DOCUMENTS

| | | |
|---|---|---|
| 2018/0139668 A1 | 5/2018 | Takahashi et al. |
| 2018/0139774 A1* | 5/2018 | Ma .................... H04L 1/1896 |
| 2019/0229843 A1 | 7/2019 | Yoshimoto et al. |
| 2019/0253193 A1 | 8/2019 | Kim et al. |
| 2020/0322991 A1 | 10/2020 | Sano et al. |
| 2021/0235479 A1 | 7/2021 | Tang |

FOREIGN PATENT DOCUMENTS

| | | | |
|---|---|---|---|
| JP | 2019527954 A | 10/2019 | |
| WO | 2016125888 A1 | 8/2016 | |
| WO | 2017169825 A1 | 10/2017 | |
| WO | 2017209570 A1 | 12/2017 | |
| WO | WO-2017209570 A1 * | 12/2017 | ........ H04W 74/0833 |
| WO | 2018008406 A1 | 1/2018 | |
| WO | WO-2018008406 A1 * | 1/2018 | ........... H04L 1/0041 |
| WO | 2018056775 A1 | 3/2018 | |

OTHER PUBLICATIONS

ISR and Written Opinion received for EP application No. 19776683.5, dated Apr. 28, 2021, 10 pages.
NOMA related procedure, Feb. 26-Mar. 2, 2018, 8 pages.
Notice of Reasons of refusal for Japanese Patent Application No. 2020-553535, dated Dec. 15, 2021, 3 Pages.
Second Office Action for Japanese Application No. 2020-553535, dated Aug. 5, 2022, 3 Pages.

* cited by examiner

UPLINK TRANSMISSION METHOD AND TERMINAL

CROSS-REFERENCE TO RELATED APPLICATION

The present application a continuation application of PCT Application No. PCT/CN2019/077795 filed on Mar. 12, 2019, which claims a priority to the Chinese patent application No. 201810276657.9 filed in China on Mar. 30, 2018, a disclosure of which is incorporated herein by reference in its entirety.

TECHNICAL FIELD

The present disclosure relates to the field of communications technologies, and in particular to an uplink transmission method and a terminal.

BACKGROUND

Compared with previous communication systems, future fifth-generation (5G) mobile communication systems are required to adapt to more diverse scenarios and service requirements. Main scenarios for new radio (New radio, NR) include enhanced mobile broadband (enhanced mobile broadband, eMBB), massive machine type of communication (massive machine type of communication, mMTC) and ultra-reliable and low latency communications (Ultra-Reliable and Low Latency Communications, URLLC), these scenarios put forward requirements for the system such as high reliability, low latency, large bandwidth, and wide coverage, etc.

In conventional uplink transmission modes, a scheduling request (scheduling request, SR) is required to send firstly in a case that a terminal has uplink data to be sent. After receiving the SR sent by the terminal, a base station allocates uplink transmission resources for the terminal via an uplink grant (UL grant). The terminal performs transmission of the uplink data based on scheduling information after receiving the UL grant. In this way, better system performance may be achieved in a case that bandwidth is not limited or a number of connections is low. The NR supports semi-static scheduling (configured grant) to reduce signaling interaction process, thus reducing power consumption of the terminal. In order to improve resource utilization, multiple terminals may send uplink data on a same resource in an unlicensed manner.

In an orthogonal transmission mode, transmissions of different terminals are orthogonal in a time-frequency domain, so that the base station no longer needs to distinguish the terminals after the terminals are identified by demodulation reference signals (Demodulation Reference Signal, DMRS). In a non-orthogonal transmission mode, the base station not only identifies the terminals, but also performs multiuser detection on uplink received signals. This increases reception complexity and processing delay of the base station. At the same time, one-to-one correspondence between limited terminal signature signals and the terminals is difficult to meet scenarios that require support for a large number of terminals access.

SUMMARY

An uplink transmission method and a terminal are provided in the embodiments of the present disclosure.

In a first aspect, an uplink transmission method applied to a terminal is provided in an embodiment of the present disclosure, including:

acquiring at least one piece of demodulation reference signal (DMRS) configuration information and at least one multiple access signature configured by a network device;

selecting a piece of target DMRS configuration information and a target multiple access signature, which have a corresponding relationship, from the at least one piece of DMRS configuration information and the at least one multiple access signature, and performing an uplink transmission;

where one piece of DMRS configuration information corresponds to one multiple access signature, and different multiple access signatures correspond to different pieces of DMRS configuration information.

In a second aspect, a terminal is provided in an embodiment of the present disclosure, including:

an acquisition module, configured to acquire at least one piece of demodulation reference signal (DMRS) configuration information and at least one multiple access signature configured by a network device;

a transmission module, configured to select a piece of target DMRS configuration information and a target multiple access signature, which have a corresponding relationship, from the at least one piece of DMRS configuration information and the at least one multiple access signature, and perform uplink transmission;

where one piece of DMRS configuration information corresponds to one multiple access signature, and different multiple access signatures correspond to different pieces of DMRS configuration information.

In a third aspect, a terminal is provided in an embodiment of the present disclosure, including: a storage, a processor, and a computer program stored in the storage and executable by the processor, wherein the processor executes the processor to perform the uplink transmission method described above.

In a fourth aspect, a computer readable storage medium is provided in an embodiment of the present disclosure, wherein a computer program is stored in the computer readable storage medium, a processor executes the computer program to perform the uplink transmission method above.

According to the embodiments of the present disclosure, a piece of target DMRS configuration information and a target multiple access signature, that have a corresponding relationship, are selected from the at least one piece of DMRS configuration information and the at least one multiple access signature configured by a network device, and uplink transmission is performed, so as to reduce reception complexity and processing delay of a base station, support access of a large number of terminals, and improve performance of network communication.

BRIEF DESCRIPTION OF THE DRAWINGS

In order to more clearly illustrate the technical solutions in embodiments of the present application or in related technologies, the drawings used in the description of the embodiments or related technologies will be briefly introduced below. Obviously, the drawings in the following description are only some embodiments of the present application. Based on these drawings, other drawings may be obtained by those skilled in the art without any creative work.

DETAILED DESCRIPTION

Figure 1:
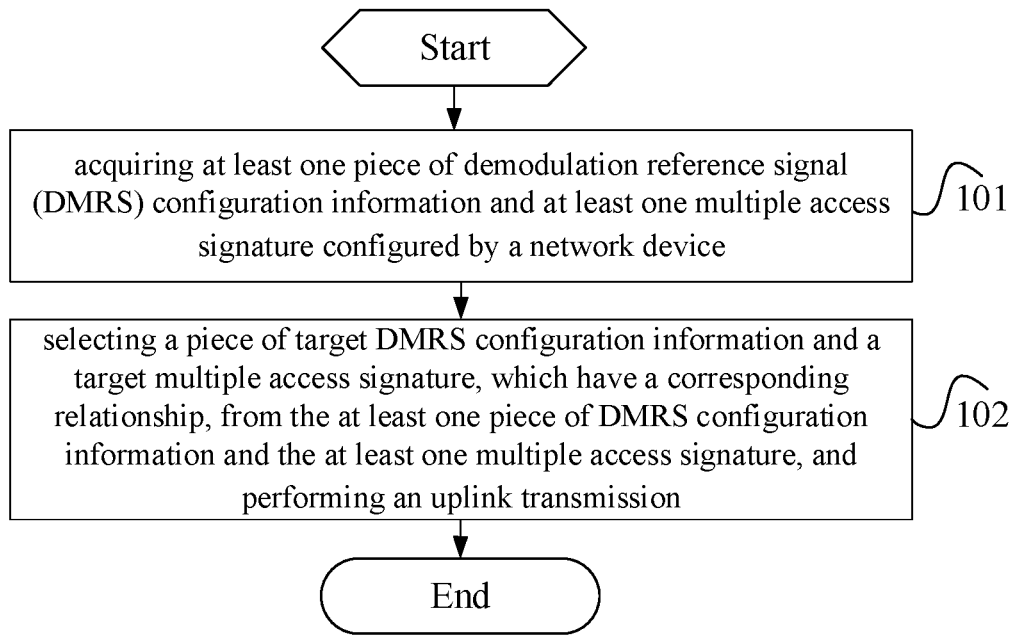
FIG. 1 is a schematic flowchart of an uplink transmission method applied to a terminal side according to an embodiment of the present disclosure.

The technical solutions of embodiments of the present disclosure will be clearly and completely described below with reference to the drawings of embodiments of the present disclosure, apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure.

The terms "first", "second" and the like in the specification and claims of the present application are used to distinguish similar objects, and are not necessarily used to describe a particular order or chronological order. It is to be understood that the data so used may be interchangeable under appropriate circumstances, so that embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. In addition, the term "and/or" in the specification and claims indicates at least one of connected objects, for example, A and/or B may mean these three cases: A exists alone, B exists alone and A and B exist simultaneously.

In embodiments of the present disclosure, terms such as "exemplary" or "for example" are used to represent examples, illustrations, or explanations. In embodiments of the present disclosure, any embodiment or design solution described as "exemplary" or "for example" should not be construed as being more preferable or advantageous than other embodiments or design solutions. Rather, use of terms such as "illustrative" or "for example" is intended to present concepts in a concrete manner.

Embodiments of the present disclosure will be described below with reference to the drawings. A listening indication method, a terminal, and a network device provided in an embodiment of the present disclosure may be applied in a wireless communication system. The wireless communication system may be a system employing 5th generation (5th Generation, 5G) mobile communication technology (all hereinafter referred to as 5G system), and it is understood by those skilled in the art that 5G NR systems are examples only, which is not limited.

In proceeding with description of embodiments of the present disclosure, some of concepts used in the following description are first explained and illustrated.

In order to distinguish signals of different terminals, the terminals may use non-orthogonal technologies to process uplink signals during uplink transmission, specifically, different terminals may use different multiple access signatures (Multiple Access signature). The multiple access signature may be one or more of:

a codebook (Codebook)/a codeword (Codeword);
sequence (Sequence);
interleaver and/or a mapping pattern (mapping pattern);
a demodulation reference signal (Demodulation reference signal);
a preamble (Preamble);
spatial-dimension (Spatial-dimension);
power-dimension (Power-dimension);

During reception, a base station performs multiuser detection by using an advanced receiver, and the base station distinguishes and decodes signals of the terminals according to the multiple access signatures used by the terminals.

The base station does not know which terminals will send uplink data when the terminals are performing uplink semi-static scheduled transmissions. The base station therefore needs to identify the terminals that send uplink data. Conventional methods use a demodulated reference signal (DMRS) as a signal for terminal signature. In this case, by detecting the DMRSs, the base station may know which terminals are sending uplink transmission signals.

In order to save power consumption and signaling overhead, multiple terminals may send uplink data on a same resource in a semi-static scheduling manner. The base station performs blind detection, identifies terminals that perform uplink transmission and performs multiuser detection when the base station is receiving uplink data. An embodiment of the present disclosure provides an uplink transmission method and a terminal.

Specifically, as shown in FIG. 1, an embodiment of the present disclosure provides an uplink transmission method, and the method is applied to a terminal and includes:

Step 101: acquiring at least one piece of demodulation reference signal (DMRS) configuration information and at least one multiple access signature configured by a network device.

It should be noted that, for at least one piece of DMRS configuration information and at least one multiple access signature, one piece of DMRS configuration information corresponds to one multiple access signature, and different multiple access signatures correspond to different pieces of DMRS configuration information, that is, there is a one-to-one corresponding relationship between one piece of DMRS configuration information and one multiple access signature. In other words, one piece of DMRS configuration information corresponds to only one multiple access signature, and one multiple access signature also corresponds to only one piece of DMRS configuration information. For example, the network device configures two pieces of DMRS configuration information and two multiple access signatures for the terminal, and there is a one-to-one corresponding relationship between the two pieces of DMRS configuration information and the two multiple access signatures.

Step 102: selecting a piece of target DMRS configuration information and a target multiple access signature, which have a corresponding relationship, from the at least one piece of DMRS configuration information and the at least one multiple access signature, and performing an uplink transmission.

It should be noted that, during uplink transmission, the terminal needs to select one pair for uplink transmission from multiple pieces of DMRS configuration information and multiple access signatures configured by the network device for the terminal. Specifically, after the terminal selects a piece of target DMRS configuration information and a target multiple access signature, which have a corresponding relationship, from the at least one piece of DMRS configuration information and the at least one multiple access signature, the terminal also needs to determine a data scrambling parameter according to the piece of target DMRS configuration information and the target multiple access signature, so as to control data transmission by using the data scrambling parameter.

It should be noted that, at least one piece of DMRS configuration information and at least one multiple access signature are configured by the network device for the terminal, the at least one piece of DMRS configuration information and the at least one multiple access signature may be sent together by the network device to the terminal upon completion of a configuration, or the at least one piece of DMRS configuration information and the at least one multiple access signature may also be sent by the network device to the terminal at different times. For example, during transmission, the network device may send at least one piece of DMRS configuration information to the terminal at a first time and send at least one multiple access signature to the terminal at a second time. Since there is a mapping relationship between at least one piece of DMRS configuration information and at least one multiple access signature, the mapping relationship between the two may be agreed by a protocol agreement, may be directly available to the terminal side, or may also be notified to the terminal by the network device. The network device may send the mapping relationship, at least one piece of DMRS configuration information and at least one multiple access signature to the terminal at the same time or at different time.

Specifically, the network device may send the above information through a broadcasting or a radio resource control (RRC) signaling (e.g., dedicated RRC signaling). Specifically, the terminal acquires at least one piece of DMRS configuration information and at least one multiple access signature through a broadcasting or a preset RRC signaling.

It should also be noted that the network device may perform a configuration for a piece of DMRS configuration information and a multiple access signature by using one of the following manners.

Manner 1: pieces of DMRS configuration information and multiple access signatures configured by the network device for different terminals are different in a case that the network device performs a configuration for at least one piece of DMRS configuration information and at least one multiple access signature.

Figure 2:
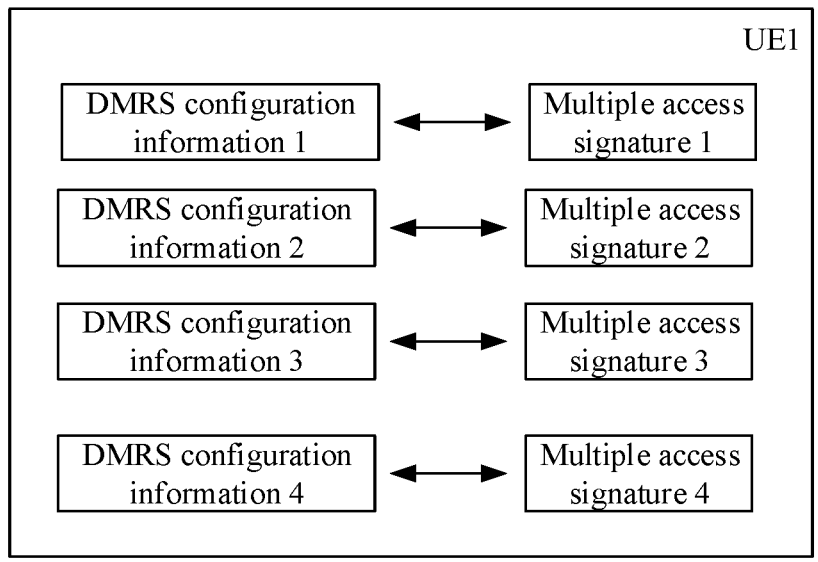
FIG. 2 is a schematic diagram of a corresponding relationship between pieces of DMRS configuration information and multiple access signatures of UE1.
Figure 3:
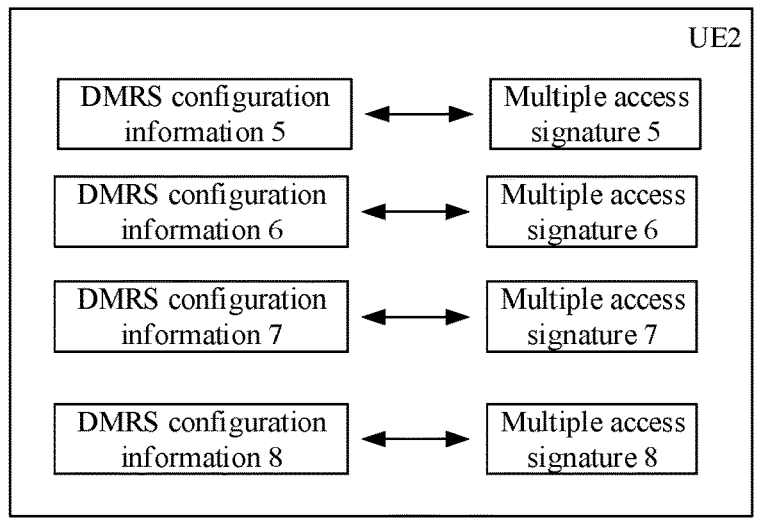
FIG. 3 is a first schematic diagram of a corresponding relationship between pieces of DMRS configuration information and multiple access signatures of UE2.

For example, different pieces of DMRS configuration information are configured by the network device for UE1 and UE2, and correspond to different multiple access signatures. As shown in FIG. 2, pieces of DMRS configuration information of UE1 are DMRS configuration information 1, DMRS configuration information 2, DMRS configuration information 3, and DMRS configuration information 4, respectively. The corresponding multiple access signatures are multiple access signature 1, multiple access signature 2, multiple access signature 3 and multiple access signature 4, respectively; As shown in FIG. 3, pieces of DMRS configuration information of UE2 are DMRS configuration information 5, DMRS configuration information 6, DMRS configuration information 7, and DMRS configuration information 8, respectively. The corresponding multiple access signatures are multiple access signature 5, multiple access signature 6, multiple access signature 7 and multiple access signature 9, respectively.

Manner 2: in a case that there are some pieces of same DMRS configuration information among pieces of DMRS configuration information configured by the network device for different terminals, multiple access signatures configured for the different terminals corresponding to the some pieces of same DMRS configuration information are the same.

Figure 4:
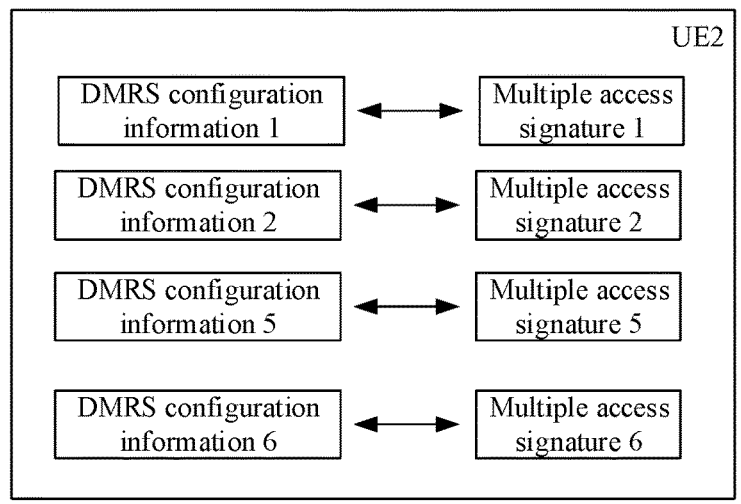
FIG. 4 is a second schematic diagram of a corresponding relationship between pieces of DMRS configuration information and multiple access signatures of UE2.

For example, at least one piece of DMRS configuration information and at least one multiple access signature are configured by the network device for UE1 and UE2, candidate sets of UE1 and UE2 include some pieces of same DMRS configuration information, and multiple access signatures corresponding to the some pieces of same DMRS configuration information are the same. As shown in FIG. 2, DMRS parameters of UE1 are DMRS configuration information 1, DMRS configuration information 2, DMRS configuration information 3, and DMRS configuration information 4, respectively. The corresponding multiple access signatures are multiple access signature 1, multiple access signature 2, multiple access signature 3 and multiple access signature 4, respectively; As shown in FIG. 4, pieces of DMRS configuration information of UE2 are DMRS configuration information 1, DMRS configuration information 2, DMRS configuration information 5, and DMRS configuration information 6, respectively. The corresponding multiple access signatures are multiple access signature 1, multiple access signature 2, multiple access signature 5 and multiple access signature 6, respectively.

Manner 3: in a case that there are some pieces of same DMRS configuration information among pieces of DMRS configuration information configured by the network device for different terminals, multiple access signatures corresponding to the some pieces of same DMRS configuration information configured for the different terminals are different.

Figure 5:
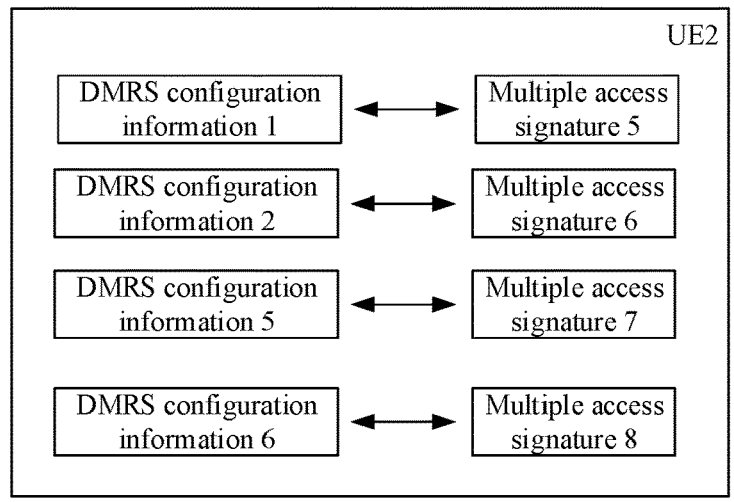
FIG. 5 is a third schematic diagram of a corresponding relationship between pieces of DMRS configuration information and multiple access signatures of UE2.

For example, at least one piece of DMRS configuration information and at least one multiple access signature are configured by the network device for UE1 and UE2, candidate sets of UE1 and UE2 include some pieces of same DMRS configuration information, and multiple access signatures corresponding to the some pieces of same DMRS configuration information configured for different terminals are different. As shown in FIG. 2, pieces of DMRS configuration information of UE1 are DMRS configuration information 1, DMRS configuration information 2, DMRS configuration information 3, and DMRS configuration information 4, respectively. The corresponding multiple access signatures are multiple access signature 1, multiple access signature 2, multiple access signature 3 and multiple access signature 4, respectively; As shown in FIG. 5, pieces of DMRS configuration information of UE2 are DMRS configuration information 1, DMRS configuration information 2, DMRS configuration information 5, and DMRS configuration information 6, respectively. The corresponding multiple access signatures are multiple access signature 5, multiple access signature 6, multiple access signature 7 and multiple access signature 8, respectively.

It should also be noted that, one piece of DMRS configuration information includes at least one scrambling parameter generated by a DMRS sequence in a case that a cyclic prefix-orthogonal frequency division multiplexing waveform is used, that is, for a same terminal, multiple access signatures corresponding to scrambling parameters belonging to a piece of DMRS configuration information are the same.

Figure 6:
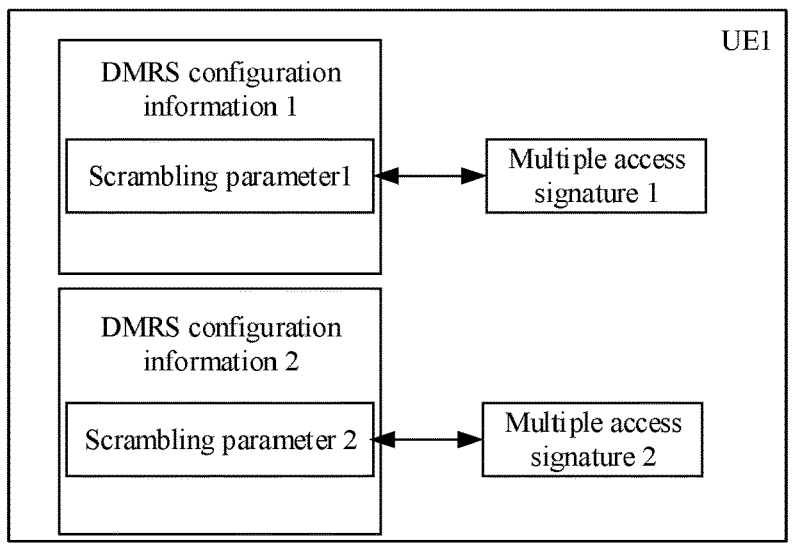
FIG. 6 is a first schematic diagram of a corresponding relationship between scrambling parameters in a piece of DMRS configuration information and multiple access signatures of UE1 in a case that a cyclic prefix-orthogonal frequency division multiplexing waveform is used.
Figure 7:
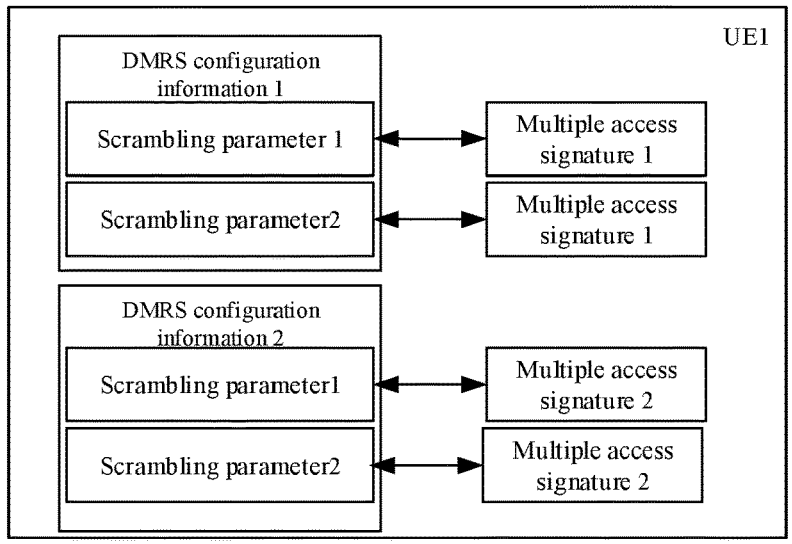
FIG. 7 is a second schematic diagram of a corresponding relationship between scrambling parameters in pieces of DMRS configuration information and multiple access signatures of UE1 in a case that a cyclic prefix-orthogonal frequency division multiplexing waveform is used.

For example, UE1 includes pieces of DMRS configuration information, and each piece of DMRS configuration information includes at least two scrambling parameters, and multiple access signatures corresponding to scrambling parameters belonging to a piece of DMRS configuration information are the same. For example, as shown in FIG. 6, UE1 includes DMRS configuration information 1 and DMRS configuration information 2, wherein DMRS configuration information 1 includes scrambling parameter 1, the corresponding multiple access signature is multiple access signature 1; DMRS configuration information 2 includes scrambling parameter 2, the corresponding multiple access signature is multiple access signature 2; as shown in FIG. 7, UE1 includes DMRS configuration information 1 and DMRS configuration information 2, wherein DMRS configuration information 1 includes scrambling parameter 1 and scrambling parameter 2, the corresponding multiple access signatures are multiple access signature 1; DMRS configuration information 2 includes scrambling parameter 1 and scrambling parameter 2, the corresponding multiple access signatures are multiple access signature 2.

Further, after the piece of target DMRS configuration information and the target multiple access signature is determined, the piece of target DMRS configuration information and the target multiple access signature may be used for uplink transmission. It should be noted that, during transmission, identification information of the terminal (e.g., ID of the terminal) is sent together with data. Specifically, one of the following manners may be adopted during the uplink transmission:

A1, identification information of the terminal is sent through a media access control layer control element (MAC CE);

It should be noted that, in this case, the network device needs to successfully decode data before acquiring the identification information of the terminal.

A2, identification information of the terminal is scrambled in a cyclic redundancy check code (CRC) for transmission;

It should be noted that, in this case, the identification information of the terminal is scrambled to a CRC check bit of data, and the CRC check bit is used to check the data and will be sent along with the data.

A3, identification information of the terminal is carried in a data channel for transmission;

It should be noted that, in this case, the identification information of the terminal is carried in a reserved resource in the data channel, and the identification information of the terminal is encoded independently and carried in the data channel. Information, such as an encoding rate and beta offset when the identification information of the terminal is carried in the data channel, may be configured by the network device.

A4, identification information of the terminal is attached to a transmission block for transmission.

It should be noted that, in this case, the identification information of the terminal is encoded independently and attached to the transmission block, or the identification information of the terminal is encoded jointly and attached to the transmission block, such as an encoding rate when the identification information of the terminal is encoded independently and attached to the transmission block, may be configured by the network device.

It should be noted that, in an embodiment of the present disclosure, a piece of target DMRS configuration information and a target multiple access signature, that have a corresponding relationship, are selected from the at least one piece of DMRS configuration information and the at least one multiple access signature configured by a network device, and uplink transmission is performed, so as to reduce reception complexity and processing delay of a base station, support access of a large number of terminals, and improve performance of network communication.

Figure 8:
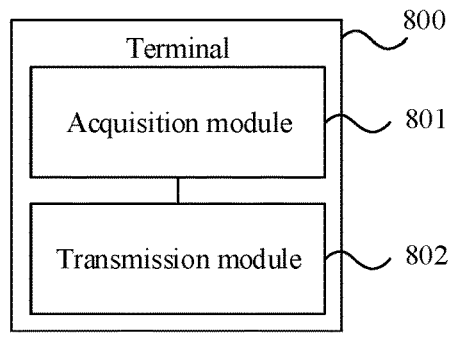
FIG. 8 is a schematic diagram illustrating modules of a terminal according to an embodiment of the present disclosure.

As shown in FIG. 8, a terminal 800 is further provided in an embodiment of the present disclosure, the terminal 800 includes:

an acquisition module 801, configured to acquire at least one piece of demodulation reference signal (DMRS) configuration information and at least one multiple access signature configured by a network device;

a transmission module 802, configured to select a piece of target DMRS configuration information and a target multiple access signature, which have a corresponding relationship, from the at least one piece of DMRS configuration information and the at least one multiple access signature, and perform uplink transmission;

where one piece of DMRS configuration information corresponds to one multiple access signature, and different multiple access signatures correspond to different pieces of DMRS configuration information.

Further, the acquisition module 801 is configured to:
acquire the at least one piece of DMRS configuration information and the at least one multiple access signature configured by the network device for the terminal through a broadcasting or a radio resource control (RRC) signaling.

Further, one piece of DMRS configuration information includes at least one scrambling parameter generated by a DMRS sequence in a case that a cyclic prefix-orthogonal frequency division multiplexing waveform is used.

Further, subsequent to the transmission module 802 configured to select the piece of target DMRS configuration information and the target multiple access signature, which have the corresponding relationship, from the at least one piece of DMRS configuration information and the at least one multiple access signature, the terminal further includes:

a determination module, configured to determine a data scrambling parameter according to the piece of target DMRS configuration information and the target multiple access signature.

Further, the transmission module 802 configured to perform the uplink transmission includes one of:

sending identification information of the terminal through a media access control layer control element;

scrambling identification information of the terminal in a cyclic redundancy check code for transmission;

carrying identification information of the terminal in a data channel for transmission;

attaching identification information of the terminal to a transmission block for transmission.

Specifically, in a case that the identification information of the terminal is carried in the data channel for transmission, the identification information of the terminal is carried in a reserved resource in the data channel, the identification information of the terminal is encoded independently and carried in the data channel.

Specifically, in a case that the identification information of the terminal is attached to the transmission block for transmission, the identification information of the terminal is encoded independently and attached to the transmission block, or the identification information of the terminal is encoded jointly and attached to the transmission block.

It should be noted that the embodiment of the terminal is a terminal corresponding to the above uplink transmission method applied at a terminal side. All implementations of the above embodiments are applicable to the embodiment of the terminal, and the same technical effects may be achieved.

Figure 9:
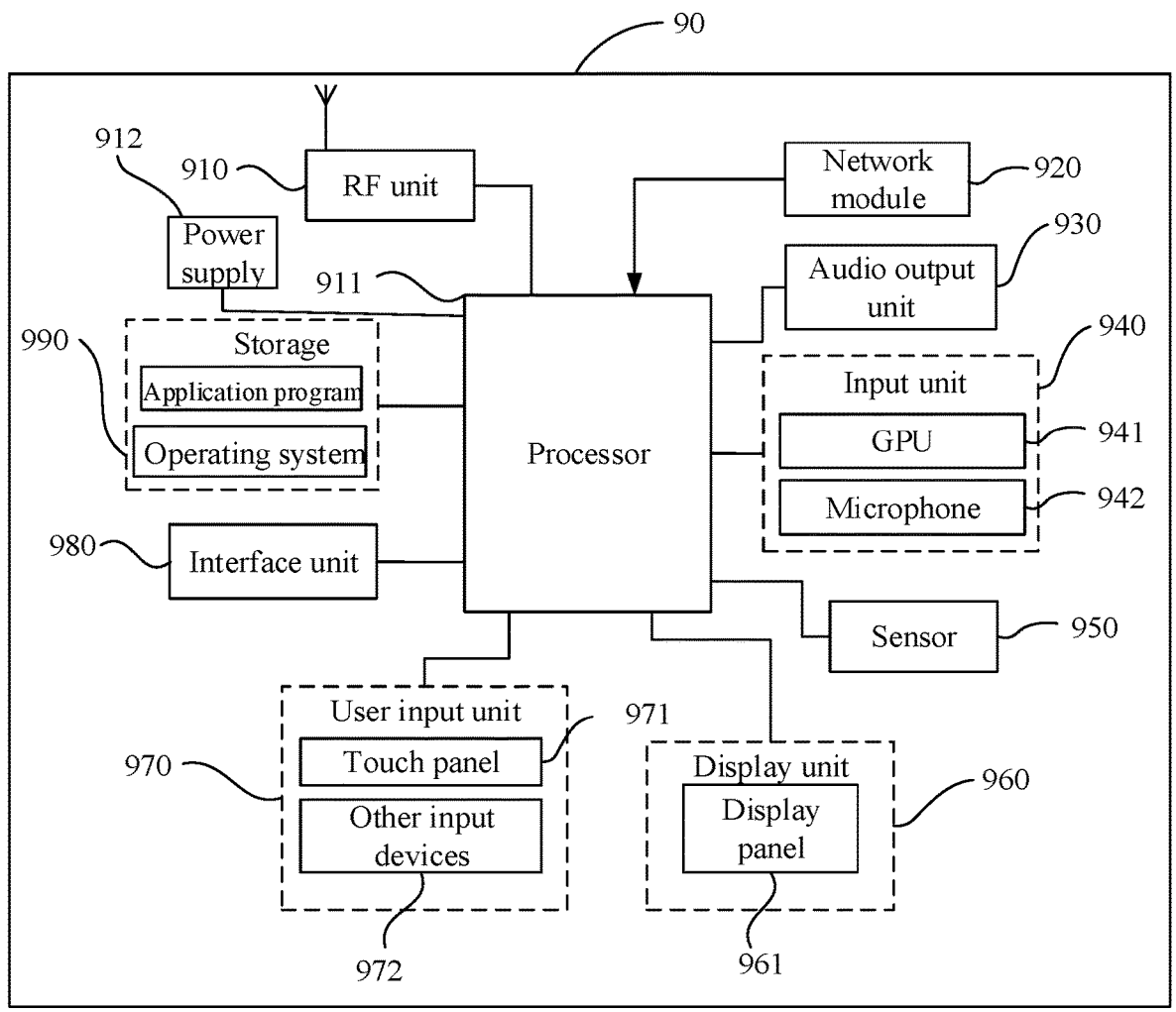
FIG. 9 is a structural block diagram illustrating a terminal according to an embodiment of the present disclosure.

FIG. 9 is a schematic structural diagram of a terminal according to an embodiment of the present disclosure.

A terminal 90 includes, but is not limited to, a radio frequency unit 910, a network module 920, and an audio output unit 930, an input unit 940, a sensor 950, a display unit 960, a user input unit 970, an interface unit 980, a storage 990, a processor 911, and a power supply 912 and other components. Those skilled in the art may understand that the structure of the terminal shown in FIG. 9 does not constitute a limitation on the terminal, and the terminal may include more or fewer components than shown in the figure, or some combined components, or different arrangements of components. In the embodiment of the present disclosure, the terminal includes, but is not limited to, a mobile phone, a tablet computer, a notebook computer, a palmtop computer, a car terminal, a wearable device, a pedometer, and the like.

The processor is configured to acquire at least one piece of demodulation reference signal (DMRS) configuration information and at least one multiple access signature configured by a network device; select a piece of target DMRS configuration information and a target multiple access signature, which have a corresponding relationship, from the at least one piece of DMRS configuration information and the at least one multiple access signature, and perform uplink transmission;

One piece of DMRS configuration information corresponds to one multiple access signature, and different multiple access signatures correspond to different pieces of DMRS configuration information.

In an embodiment of the present disclosure, a terminal selects a piece of target DMRS configuration information and a target multiple access signature, that have a corresponding relationship, from the at least one piece of DMRS configuration information and the at least one multiple access signature configured by a network device, and performs uplink transmission, so as to reduce reception complexity and processing delay of a base station, support access of a large number of terminals, and improve performance of network communication.

It should be understood that, in an embodiment of the present disclosure, the radio frequency unit 91 may be used to receive and send information or send and receive signals during a call. Specifically, downlink data from a network device is received and processed by the processor 911; in addition, uplink data is sent to the network device. Generally, the radio frequency unit 910 includes, but is not limited to, an antenna, at least one amplifier, a transceiver, a coupler, a low-noise amplifier, a duplexer, and the like. In addition, the radio frequency unit 910 may also communicate with a network and other devices through a wireless communication system.

The terminal provides users with wireless broadband Internet access through the network module 920, such as helping users to send and receive email, to browse web pages, and to access streaming media, etc.

The audio output unit 93 may convert audio data received by the radio frequency unit 910 or the network module 920 or stored in the storage 990 into audio signals and output them as sound. Moreover, the audio output unit 930 may also provide audio output (for example, call signal reception sound, message reception sound, etc.) related to a specific function performed by the terminal 90. The audio output unit 930 includes a speaker, a buzzer, a receiver, and the like.

The input unit 940 is used to receive audio signals or video signals. The input unit 940 may include a graphics processing unit (GPU) 941 and a microphone 942, and the graphics processing unit 941 processes image data of a still picture or video obtained by an image capture device (such as a camera) in a video capture mode or an image capture mode. The processed image frames may be displayed on the display unit 960. The image frames processed by the graphics processing unit 941 may be stored in the storage 990 (or other storage medium) or transmitted via the radio frequency unit 910 or the network module 920. The microphone 942 may receive sound, and may process such sound into audio data. The processed audio data may be converted into an output format that may be transmitted to a mobile communication network device via the radio frequency unit 910 in the case of a telephone call mode.

The terminal 90 further includes at least one sensor 950, such as a light sensor, a motion sensor, and other sensors. Specifically, the light sensor includes an ambient light sensor and a proximity sensor, wherein the ambient light sensor may adjust brightness of a display panel 961 according to brightness of the ambient light, and the proximity sensor may turn off the display panel 961 and/or backlight in a case that the terminal 90 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 950 may also include a fingerprint sensor, a pressure sensor, an iris sensor, a molecular sensor, a gyroscope, a barometer, a hygrometer, a thermometer, an infrared sensor and the like, which are not repeated here.

The display unit 960 may be configured to display information inputted by the user or information provided to the user. The display unit 960 may include the display panel 961, and the display panel 961 may be configured as a form of a Liquid Crystal Display (LCD), an Organic Light-Emitting Diode (OLED) or the like.

The user input unit 970 may be used to receive numeric information or character information input by a user and generate a signal input related to the user's settings and related to the function control of the terminal. Specifically, the user input unit 970 includes a touch panel 971 and other input devices 972. The touch panel 971, also referred to as a touch screen, may collect the user's touch operations thereon or nearby (such as the user's operation on the touch panel 971 or near the touch panel 971 using any suitable object or accessory such as a finger or a stylus). The touch panel 971 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 911, and may receive and execute a command from the processor 911. In addition, the touch panel 971 can be implemented in various types such as resistive, capacitive, infrared, and surface acoustic waves, etc. In addition to the touch panel 971, the user input unit 970 may further include other input devices 972. Specifically, the other input devices 972 may include, but are not limited to, a physical keyboard, a function button (such as a volume control button, a switch button, etc.), a trackball, a mouse, and a joystick, and details thereof are not described herein again.

Further, the touch panel 971 may cover the display panel 961, in a case that the touch screen 971 detects a touch operation thereon or nearby, the touch operation is transmitted to the processor 911 to determine the type of the touch event, then the processor 911 provides a corresponding visual output on the display screen 961 based on the type of the touch event. Although in FIG. 9, the touch panel 971 and the display panel 961 are implemented as two independent components to implement input and output functions of the terminal, in some embodiments, the touch panel 971 and the display panel 961 may be integrated to implement the input and output functions of the terminal, which are not limited here.

The interface unit 980 is an interface through which an external device is connected to the terminal 90. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 980 may be used to receive input (e.g., data information, power, etc.) from the external device and transmit the received input to one or more elements within the terminal 90 or may be used to transmit data between the terminal 90 and the external device.

The storage 990 may be used to store software programs and various data. The storage 990 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 990 may include a high-speed random access storage, and may further include a non-volatile storage, such as at least one magnetic disk storage device, a flash memory device, or other volatile solid-state storage device.

The processor 911 is a control center of the terminal, and uses various interfaces and lines to connect various parts of the entire terminal. By running or executing software programs and/or modules stored in the storage 990 and calling data stored in the storage 990, various functions of the terminal and processing data are performed, so that the overall monitoring of the terminal is performed. The processor 911 may include one or more processing units; optionally, the processor 911 may integrate an application processor and a modem processor, wherein the application processor mainly processes an operating system, a user interface, and an application program, etc. The modem processor mainly handles wireless communication. It could be understood that the modem processor may not be integrated into the processor 911.

The terminal 90 may further include a power source 912 (such as a battery) for supplying power to various components. Optionally, the power supply 912 may be logically connected to the processor 911 through a power management system, so as to implement functions such as management of charging, management of discharging, and power consumption management through the power management system.

In addition, the terminal 90 includes some functional modules that are not shown, and details are not described herein again.

Optionally, a terminal is further provided n an embodiment of the present disclosure, and the terminal includes: a processor 911, a storage 990, and a computer program stored in the storage 990 and executable by the processor 911, the computer program is used to executed by the processor 911 to implement various processes in embodiments of the uplink transmission method applied to a terminal side, and the same technical effect may be achieved, which will not be repeated herein to avoid repetition.

A computer readable storage medium is further provided in an embodiment of the present disclosure, the computer program is stored in the computer readable storage medium, and the computer program is executed by a processor to implement various processes in embodiments of the uplink transmission method applied to a terminal side, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

The network device in embodiments of the present disclosure may be a base transceiver station (Base Transceiver Station, BTS) in a global system of mobile communication (Global System of Mobile communication, GSM) or code division multiple access (Code Division Multiple Access, CDMA), a NodeB (NodeB, NB) in wideband code division multiple access (Wideband Code Division Multiple Access, WCDMA), an evolutional Node B (Evolutional Node B, eNB or eNodeB) in LTE, or a relay station or an access point, or a base station in a future 8G network, etc., which is not limited here.

It should be noted that, in the present article, the terms "including" or "having" or any other variations thereof are intended to encompass a non-exclusive inclusion, such that a process, method, article, or device that includes a plurality of elements includes not only those elements but also other elements not explicitly listed, or elements that are inherent to such a process, method, article, or device. An element defined by the phrase "comprising a . . . " does not exclude the presence of additional identical elements in the process, method, article, or device that comprises the element, without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiment of the present disclosure.

The descriptions above are optional embodiments of the disclosure, it should be noted that the improvements and the embellishments within the scope of the present disclosure shall be within the scope of the disclosure to those of ordinary skill in the art.

What is claimed is:

1. An uplink transmission method, applied to a terminal, comprising:
    acquiring at least one piece of demodulation reference signal (DMRS) configuration information and at least one multiple access signature configured by a network device;
    selecting a piece of target DMRS configuration information and a target multiple access signature, which have a corresponding relationship, from the at least one piece of DMRS configuration information and the at least one multiple access signature, and performing an uplink transmission;
    wherein the at least one piece of DMRS configuration information is in a mapping relationship with the at least one multiple access signature, and the mapping relationship is predefined in a protocol, one piece of DMRS configuration information corresponds to one multiple access signature, and different multiple access signatures correspond to different pieces of DMRS configuration information;
    wherein the performing an uplink transmission comprises:
    sending identification information of the terminal through a media access control layer control element;
    wherein one piece of DMRS configuration information comprises at least one scrambling parameter generated by a DMRS sequence when a cyclic prefix-orthogonal frequency division multiplexing waveform is used.

2. The uplink transmission method according to claim 1, wherein the acquiring the at least one piece of demodulation reference signal (DMRS) configuration information and the at least one multiple access signature configured by the network device comprises:
    acquiring the at least one piece of DMRS configuration information and the at least one multiple access signature configured by the network device for the terminal through a broadcasting or a radio resource control (RRC) signaling.

3. The uplink transmission method according to claim 1, wherein subsequent to selecting the piece of target DMRS configuration information and the target multiple access signature, which have the corresponding relationship, from the at least one piece of DMRS configuration information and the at least one multiple access signature, the method further comprises:
    determining a data scrambling parameter according to the piece of target DMRS configuration information and the target multiple access signature.

4. The uplink transmission method according to claim 1, wherein the multiple access signature is a preamble.

5. A terminal, comprising: a storage, a processor, and a program stored in the storage and executable by the processor, wherein the processor executes the computer program to:
    acquire at least one piece of demodulation reference signal (DMRS) configuration information and at least one multiple access signature configured by a network device;
    select a piece of target DMRS configuration information and a target multiple access signature, which have a corresponding relationship, from the at least one piece of DMRS configuration information and the at least one multiple access signature, and perform uplink transmission;
    wherein the at least one piece of DMRS configuration information is in a mapping relationship with the at least one multiple access signature, and the mapping relationship is predefined in a protocol, one piece of DMRS configuration information corresponds to one multiple access signature, and different multiple access signatures correspond to different pieces of DMRS configuration information;
    wherein the processor executes the computer program to perform:
    sending identification information of the terminal through a media access control layer control element;
    wherein one piece of DMRS configuration information comprises at least one scrambling parameter generated by a DMRS sequence when a cyclic prefix-orthogonal frequency division multiplexing waveform is used.

6. The terminal according to claim 5, wherein the processor executes the computer program to:
    acquire the at least one piece of DMRS configuration information and the at least one multiple access signature configured by the network device for the terminal through a broadcasting or a radio resource control (RRC) signaling.

7. The terminal according to claim 5, wherein in a case that the piece of target DMRS configuration information and the target multiple access signature, which have the corresponding relationship, are selected from the at least one piece of DMRS configuration information and the at least one multiple access signature, the processor executes the computer program to:
    determine a data scrambling parameter according to the piece of target DMRS configuration information and the target multiple access signature.

8. The terminal according to claim 5, wherein the multiple access signature is a preamble.

9. A non-transitory computer readable storage medium, wherein a computer program is stored in the computer readable storage medium, a processor executes the computer program to:
    acquire at least one piece of demodulation reference signal (DMRS) configuration information and at least one multiple access signature configured by a network device;
    select a piece of target DMRS configuration information and a target multiple access signature, which have a corresponding relationship, from the at least one piece of DMRS configuration information and the at least one multiple access signature, and perform an uplink transmission;
    wherein the at least one piece of DMRS configuration information is in a mapping relationship with the at least one multiple access signature, and the mapping relationship is predefined in a protocol, one piece of DMRS configuration information corresponds to one multiple access signature, and different multiple access signatures correspond to different pieces of DMRS configuration information;

wherein the processor executes the computer program to perform:

sending identification information of the terminal through a media access control layer control element;

wherein one piece of DMRS configuration information comprises at least one scrambling parameter generated by a DMRS sequence when a cyclic prefix-orthogonal frequency division multiplexing waveform is used.

\* \* \* \* \*